United States Patent [19]
Sygnator

[11] 3,835,495
[45] Sept. 17, 1974

[54] METHOD AND APPARATUS FOR SWAGING SCREW BLANK EXTREMITIES
[75] Inventor: Henry Anton Sygnator, Arlington Heights, Ill.
[73] Assignee: Illinois Tool Works Inc., Chicago, Ill.
[22] Filed: Dec. 29, 1972
[21] Appl. No.: 319,279

[52] U.S. Cl. ............... 10/10 R, 10/2, 10/152 R, 72/276
[51] Int. Cl. ....................... B21h 3/02, B23g 9/00
[58] Field of Search ........... 10/2, 10 R, 27 E, 27 R, 10/152 R, 152 T, 153; 85/1 P, 41; 72/260, 276, 467

[56] References Cited
UNITED STATES PATENTS

| | | | |
|---|---|---|---|
| 3,024,896 | 3/1962 | Scribner | 72/281 X |
| 3,072,933 | 1/1963 | Carlson | 10/27 E |
| 3,104,161 | 9/1963 | Carlson | 10/10 R |
| 3,384,911 | 5/1968 | Carlson | 10/10 R |
| 3,423,778 | 1/1969 | Morse | 85/41 X |
| 3,461,470 | 8/1969 | Cochrum | 10/10 R |
| 3,803,889 | 4/1974 | Muenchinger | 72/88 |

Primary Examiner—C. W. Lanham
Assistant Examiner—D. M. Gurley
Attorney, Agent, or Firm—Olson, Trexler, Wolters, Bushell & Fosse Ltd.

[57] ABSTRACT

The present invention relates generally to improvements in methods and mechanisms for swaging the entering portion of a screw blank, and more specifically to novel methods and mechanisms for producing screw blanks having laterally offset, substantially conical entering or work swaging portions and a pilot extending therefrom. The invention as disclosed herein contemplates the use of a novel die arrangement wherein a first die section is provided with an open-ended cylindrical bore for telescopically accommodating a screw blank of corresponding size. An adjacently positioned second die section having a substantially conical bore is adapted to receive the entering extremity of a screw blank from the first die section. The substantially conical bore has a peripheral surface comprised of a pair of segments of conical surfaces each generated from axes which are offset or laterally displaced and one of these axes being coincident with the axis of the bore in the first die section. This second die section is positioned intermediate the first die section and a third die section having a pilot-forming bore the central axis of which is coincident with the bore of the first die section.

15 Claims, 14 Drawing Figures

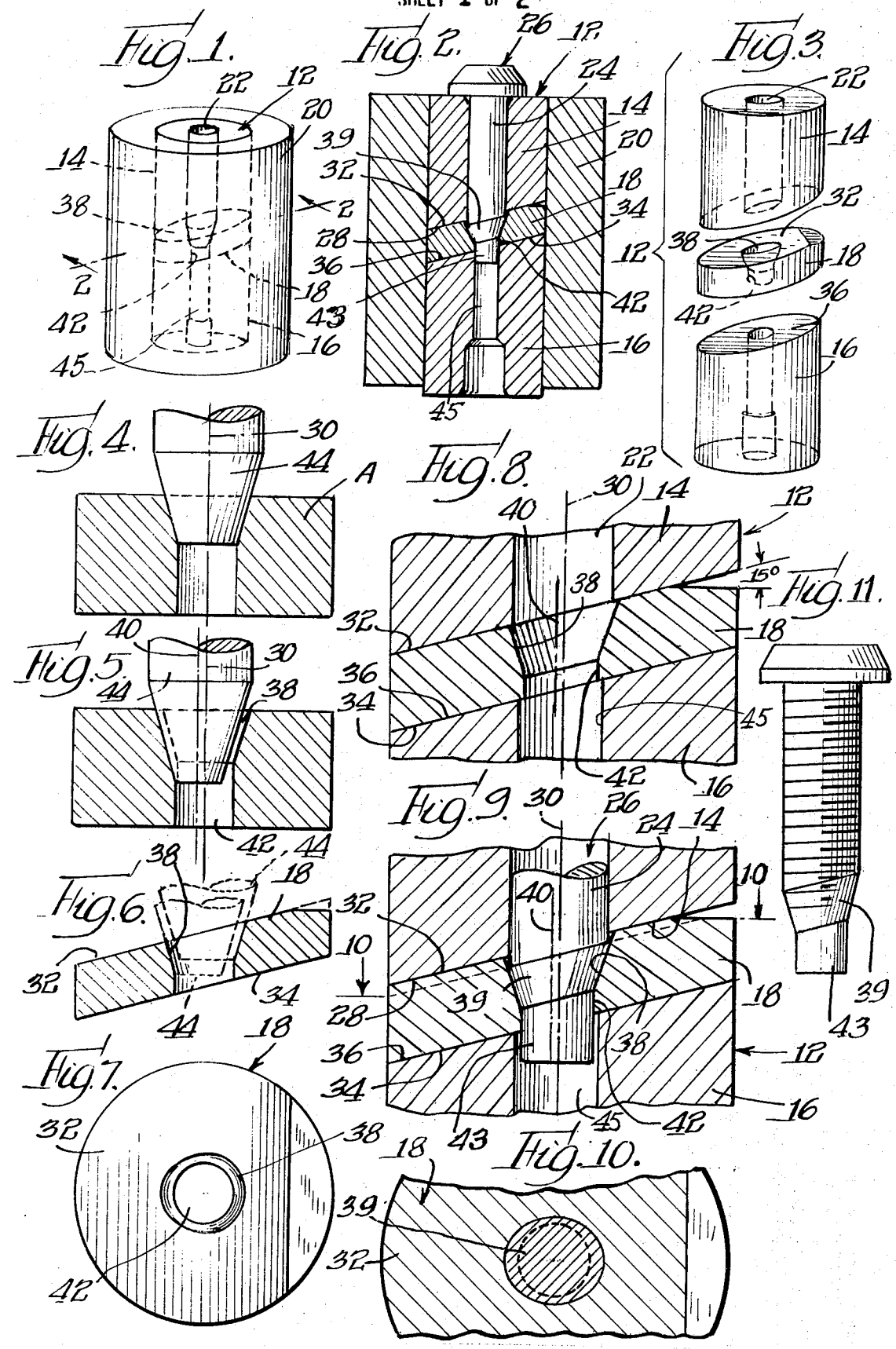

METHOD AND APPARATUS FOR SWAGING SCREW BLANK EXTREMITIES

SUMMARY OF THE INVENTION

Applicant heretofore developed a novel extruding and threadforming screw fastener in which a work swaging substantially conical section is interposed between a pilot section and a cylindrical threaded shank or holding section. In such a fastener the conical section is offset laterally with respect to said cylindrical threaded section and said axially extending pilot section. It is an object of the present invention to provide novel and practical methods and means for producing screw blanks from which the above mentioned type fasteners may be formed.

More specifically, the present invention contemplates a die arrangement and method which enables the economical production of laterally offset substantially conical sections of a screw blank of the type referred to above.

It is a further object of the present invention to provide a novel die arrangement comprising a plurality of separable die sections, each section having a central bore of predetermined contour, said die sections when in stacked relation providing a continuous novel bore arrangement for telescopically accommodating and swaging the entering portion of a screw blank.

BRIEF DESCRIPTION OF THE DRAWINGS

The foregoing and other objects and advantages will be more apparent from the following detailed description when considered in connection with the accompanying drawings wherein:

FIG. 1 is a perspective view illustrating a die assembly of the type contemplated by the present invention, secured within an annular holder in readiness to telescopically accommodate a cylindrical screw blank;

FIG. 2 is a central, longitudinal sectional view of the die sections and holder therefore, and view being taken substantially along the line 2—2 of FIG. 1; FIG. 3 is a perspective exploded view of the three sections which comprise the die arrangement or assembly shown in FIGS. 1 and 2;

FIG. 4 discloses a centrally apertured cylindrical member or cylinder from which the intermediate die section may be produced, a swaging tool being disclosed in association therewith to illustrate the first swaging step in the formation of a substantially conical bore;

FIG. 5 is a view similar to FIG. 4 illustrating the manner in which the swaging tool is laterally offset to form a substantially conical bore laterally offset with respect to the cylindrical bore of the upper or first die section, as illustrated in FIGS. 1 to 3, inclusive;

FIG. 6 discloses the intermediate or second die section or wafer formed from the cylindrical die member illustrated in FIGS. 4 and 5;

FIG. 7 is a plan view of the intermediate die section or wafer shown in FIG. 6;

FIG. 8 is an enlarged fragmentary central sectional view of the intermediate or second die section and the first and the third die sections positioned on opposite sides thereof, more clearly to illustrate the surface contour of that portion of the intermediate die section which is employed to form the laterally offset substantially conical surface in a screw blank;

FIG. 9 is a view similar to FIG. 8 illustrating the position occupied by the screw blank after complete telescopic association of the blank and the die assembly has taken place;

FIG. 10 is a transverse sectional view taken substantially along the line 10—10 of FIG. 9;

FIG. 11 is a side elevational view of a screw fastener incorporating the laterally offset conical portion produced by practicing the method and employing the die assembly or mechanism contemplated by the present invention;

DESCRIPTION OF A PREFERRED EMBODIMENT OF THE INVENTION

Figure 12:
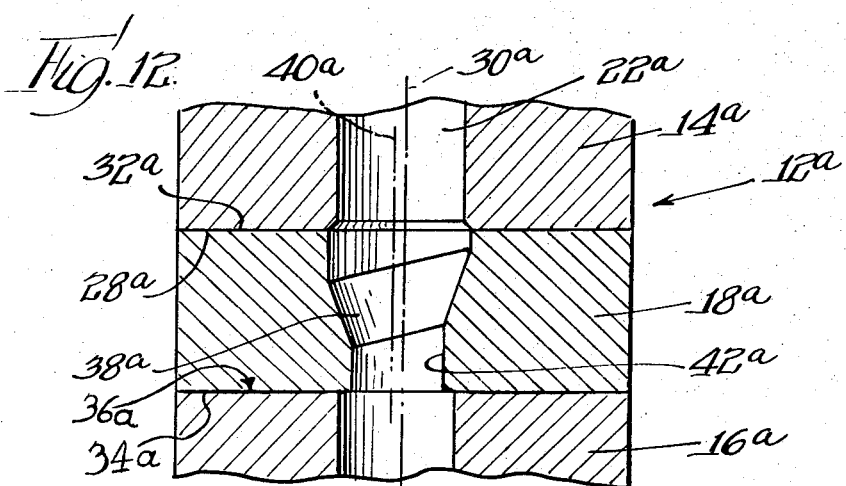
FIG. 12 is a fragmentary vertical section similar to FIG. 8, illustrating a die assembly of modified form.

Referring now to the drawings more in detail, wherein like numerals have been employed to designate similar parts throughout the various figures, it will be seen that one embodiment of the present invention includes a die arrangement or assembly designated generally by the numeral 12. This die arrangement 12 comprises three die sections, namely, end sections 14 and 16 and an intermediate, wafer-like section 18. The sections 14, 16 and 18 may be held together as a unit by means of a suitable collar 20, FIGS. 1 and 2. The die section 14, hereinafter referred to as the first die section, is provided with a central open-ended cylindrical bore 22 for telescopically accommodating the elongate cylindrical shank 24 of a screw blank 26. The inner extremity of the cylindrical die section 14 is defined by a surface 28 which is inclined at approximately 15° with respect to the central axis of the bore 22. This central axis of the die member 14 is indicated by dot-and-dash lines 30.

Mounted in flush engagement with the aforesaid surface 28 is a surface 32 of the intermediate or second wafer-like die section 18. The underside or surface 34 of the wafer-like die section 18 engages an upper complementary surface 36 of the third section 16. The wafer-like die section 18 is provided with a central substantially conical bore 38. Attention is directed to the fact that the bore 38 includes a peripheral surface which is essentially formed from a pair of segments of conical surfaces generated about axes which are laterally offset, one of the axes of generation being coincident with the axis 30 of cylindrical bore 22, as illustrated in FIGS. 5, 8 and 9. The extent of said lateral offset is indicated by the distance between the dot-and-dash line 30 and a parallel dot-and-dash line 40. A more detailed explanation of the formation of this laterally displaced, substantially conical section is later set forth herein. Die section 18 is also provided with a central pilot-forming bore 42, the central axis of which is coincident with the central axis, dot-and-dash line 30, of the bore 22. In other words, the dot-and-dash lines 30 designates the central axis of the bore 22 and the central axis of the pilot-forming bore 42. The diameter of the bore 42 is obviously smaller than the diameter of the bore 22, its size being dependent upon the required size of the pilot to be formed thereby. It will be noted that the upper portion of the pilot-forming bore 42 opens into the lower or minimum diameter of the bore 38, FIGS. 8 and 9. It will further be noted that upper surface 32 includes a portion which is generally perpendicular to the axis of the bore 22 and provides a surface which may be useful in locating the wafer-like section 18 in the desired relative position within collar 20.

The third die section 16 is provided with a central bore 45 which may be an extension of the pilot forming bore 42. In accordance with conventional cold-heading techniques, however, this bore 45 may be slightly larger than bore 42 to provide clearance for the stock.

In FIGS. 4 to 6, inclusive, is disclosed the manner in which the laterally offset, substantially conical bore 38, and the wafer-like die section is produced. A swaging tool 44 is employed to initially produce a conical bore having an axis coincident with the axis 30 by applying said tool to the central aperture of a cylindrical workpiece A, as illustrated in FIG. 4. The cylindrical aperture in the workpiece A correspond in size to the previously mentioned pilot forming bore 42, and by telescopically associating the swaging tool 44 with said aperture the formation of the aforesaid substantially conical bore 38 is initiated. Following the initial formation of the conical opening illustrated in FIG. 4, the swaging tool 44 is eccentrically positioned with respect to the axis 30, and again moved into swaging engagement with the workpiece A to a greater depth, thereby slightly enlarging the conical bore, as illustrated in FIGS. 5 and 6. This results in the final formation of the bore 38 of substantially conical contour having a portion of its periphery formed as a segment of a conical surface having a central axis disposed laterally with respect to the cylindrical bore 42 while the remaining portion of the periphery is formed as a segment of a conical surface having a central axis coincident with axis 30. After completion of the bore 38, the upper and lower portions of the workpiece A are ground or cut away, so as to present the wafer-like die section 18, as shown in FIG. 6. This modified but substantially conical bore 38 functions to produce a complementary conical section 39 at the entering portion of the screw blank 26. The bore 38, when viewed in plan, as illustrated in FIG. 7, is generally or substantially egg-shaped.

Figure 13:
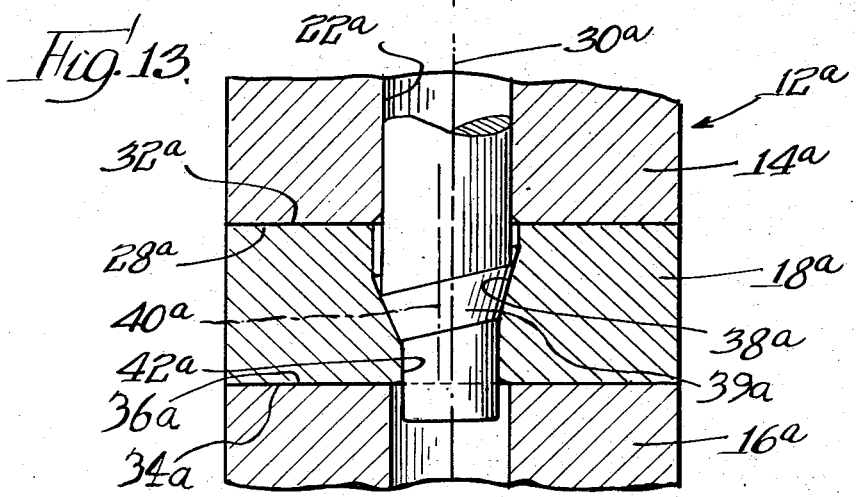
FIG. 13 is a sectional view similar to FIG. 12, illustrating the position occupied by a screw blank after complete telescopic association of the blank and die assembly has occurred.

In FIGS. 12 and 13, a modified die assembly 12a is shown. Like the previously described assembly, the assembly 12a is comprised of three sections, namely a first section 14a, a second section 16a and an intermediate or third section 18a. The lower side of the section 14a is defined by a surface 28a which abuts the upper side of the intermediate die section 18a defined by a surface 32a. Abutting surfaces 34a and 36a are parallel to the surfaces 28a and 32a, said surfaces extending at right angles to the axis 30a of coaxial cylindrical bores 22a and 42a. A lower portion of the cylindrical bore 22a is continued into the upper portion of the third section, and communicates with a substantially conical bore 38a offset laterally with respect to the cylindrical coaxial bores 22a and 42a.

Particular attention is directed to the fact that the lower extremities of the substantially conical bores 38 and 38a in the vicinity of the juncture thereof with the cylindrical pilot forming bores 42 ane 42a, respectively, in transverse section, define planes inclined at an acute angle with respect to the axis 30 and 30a, respectively. Similarly, the upper extremities of said substantially conical bores 38 and 38a in the vicinity of the juncture thereof with cylindrical shank forming bores 22 and 22a, respectively, in transverse section, define planes inclined at an acute angle with respect to said axes 30 and 30a, and parallel with the complementary inclined planes previously mentioned.

It should also be noted that while the bores or cavities 38 and 38a are substantially conical in shape the particular inner periphery described above formed by offsetting segments of conical surfaces results in a bore having a cross-sectional configuration with a major and a minor axis; The larger or upper extremities thereof have a minor diameter equal to the diameter of the cylindrical cavities 22 and 22a, respectively, and a major diameter slightly larger than said cylindrical bores 22 and 22a, as illustrated in FIGS. 2, 8, 9, 12 and 13. Thus, as a screw blank is telescopically associated with the die assembly a desired substantially conical work swaging surface 39 – 39a is formed.

Figure 14:
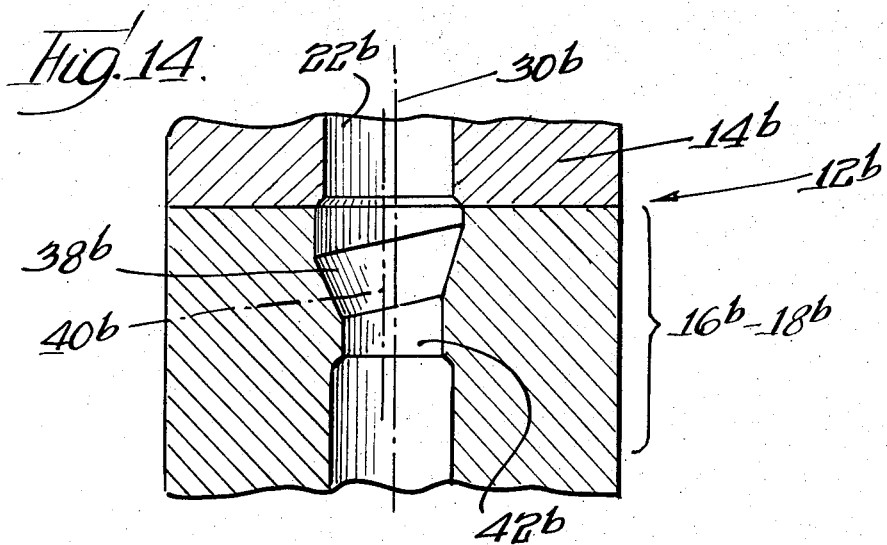
FIG. 14 is a fragmentary vertical sectional view similar to FIG. 12, illustrating a die assembly of further modified form contemplated by the present invention.

FIG. 14 illustrates a further modified die assembly indicated generally by the numeral 12b. This die assembly 12b is structurally similar to the die assembly 12a, the only structural difference being that the lower portion of the assembly of integral construction designated by numerals 16b — 18b. In all other aspects the die assembly 12b is structurally and functionally similar to the previously described die assembly 12a. Structural details of the assembly 12b corresponding with those previously mentioned are indicated by similar numerals bearing the suffix (b). As previously mentioned, the minor diameter at the upper extremity of the substantially conical bore is equal to the diameter of the elongate cylindrical bore, namely, the shank forming bores or cavities 22, 22a and 22b. The maximum diameter of said conical bore is slightly greater than the diameter of the longitudinal cylindrical bore, and as the screw blank is forced longitudinally into the die assembly the aforesaid minimum and maximum diameter will result without an abrupt resistance to formation as the blank enters the substantially conical bore. Any stock material which would tend to flow beneath the edge of die section 14 would be skived or deformed downwardly on the blank as a conventional knock-out plug ejects the blank upwardly from the die sections. In other words, the substantically conical bore of the die assembly is formed from segmented conical surfaces generated from axes which are laterally offset and one of which is offset with respect to the coaxially aligned cylindrical bores thereof so as to enable the formation of a complementary screw blank having a corresponding, laterally offset substantially conical work swaging section. It will also be noted that the upper extremity of the substantially conical bore at the juncture thereof with the lower extremity of the elongate cylindrical bore defines a transverse plane disposed at an acute angle with respect to the common axis of the longitudinal and pilot forming cylindrial bores. Likewise, the lower extremity of said substantially conical bore at the juncture thereof with the pilot forming bore defines a transverse plane substantially parallel with the above mentioned plane.

It is the above described laterally offset disposition of the substantially conical die cavity which imparts a corresponding contour to the work swaging section of a completed screw blank. After thread convolutions have been formed on the blank as illustrated in FIG. 11, and the screw is rotatably applied to an apertured workpiece, the substantially conical, laterally offset section of the screw swagingly engages the workpiece and thereby reduces the force necessary to rotate the screw in the work.

The present invention contemplates other modifications and changes without departing from the spirit and scope of the appended claims.

I claim:

1. The method of forming the entering portion of a cylindrical screw blank to include a substantially conical swaging portion and a pilot extending therefrom including the step of relatively and longitudinally moving a screw blank and a cylindrical bore of a die assembly in telescopic association, the diameter of said bore conforming substantially with the diameter of said screw blank, continuing said relative telescopic movement of said blank and die assembly so as to cause engagement of a first peripheral edge segment of the entering extremity of said blank with a first peripheral surface of a substantially conical tapered bore of said die assembly while a second, opposing, peripheral edge segment of the entering extremity of said blank is substantially unsupported within the die assembly to move and work the stock of the blank in a first direction lateral of the axis of the blank, continuing said telescopic movement to subsequently cause the second opposing peripheral edge segment of the blank to engage a second peripheral surface of said tapered bore disposed generally opposite the first peripheral surface to cause the second edge segment and first edge segment to be compressed inwardly toward each other, and continuing said relative movement so as to cause the advancing extremity of said blank to become telescopically associated with a pilot forming bore of said die assembly, said last mentioned bore being in axial alignment with and of smaller diameter than said cylindrical bore whereby the completed blank will present a cylindrical portion, a pilot portion in axial alignment therewith, and an intermediate substantially conical workpiece swaging section.

2. The method of forming the entering portion of a cylindrical screw blank as set forth in claim 1 wherein continued relative telescopic movement of the advancing extremity of said blank beyond said conical bore causes the entering extremity of said blank to enter said cylindrical pilot forming bore.

3. A die assembly for swaging the entering portion of a cylindrical screw blank including a first die section having an open-ended cylindrical bore for telescopically accommodating a complementary cylindrical screw blank, a second adjacently positioned die section having a bore of substantially conical shape for receiving and deforming the advancing extremity of a cylindrical blank from said first mentioned bore, the larger periphery of said substantially conical bore opening into the bore of said first die section, said substantially conical bore having a peripheral surface comprised of first and second portions of conical surfaces generated about noncoincident axes, one of said axes being coincident with the axis of the cylindrical bore in the first die section, the substantially conical bore having major and minor cross-sectional axes through the axial thereof, the first conical surface portion including segments disposed at a radial distance from the axis of the cylindrical bore which is less than the radial distance of the directly opposing segments on the second conical surface from said axis, said segments both lying in a plane perpendicular to said axis, pilot-forming bore means located beneath the substantially conical bore in axial alignment with the bore of the first die section and extending axially beyond the smaller diameter of said substantially conical bore, the region of merger of the cylindrical bore surfaces with the substantially conical surfaces including a first juncture line disposed at an angle to a plane extending perpendicularly to the axis of the cylindrical bore and thereby said first juncture line includes opposing peripheral segments which are essentially disposed axially from one another, the region of merger of the pilot forming bore surfaces with the substantially conical surfaces including a second juncture line disposed at an angle to a plane extending perpendicularly to the axis of the cylindrical bore, said second juncture line also including peripheral segments which are essentially disposed axially from one another, whereby the telescopic association of a cylindrical screw blank with said die sections will result in the formation of a blank presenting an elongate cylindrical portion, a pilot portion in axial alignment therewith and an intermediate substantially conical portion which has been displaced laterally with respect to said elongate cylindrical portion and said pilot portion.

4. A die assembly for swaging the entering portion of a cylindrical screw blank as set forth in claim 3 wherein said second die section includes a die element disposed at an acute angle with respect to the longitudinal axes of said elongate cylindrical portion and said pilot forming portion.

5. A die assembly for swaging the entering portion of a cylindrical screw blank as set forth in claim 4 wherein said second die section is wafer-like in shape.

6. A die assembly for swaging the entering portion of a cylindrical screw blank as set forth in claim 3, wherein a third die section is located beneath the substantially conical bore and in axial alignment with the bore of the first die section.

7. A die assembly for swaging the entering portion of a cylindrical screw blank as set forth in claim 6, wherein the pilot forming bore means is located in the second die section.

8. A die assembly for swaging the entering portion of a cylindrical screw blank as set forth in claim 6 wherein inner surfaces of said first and third die sections extend in parallelism with said inclined second die section and engage the opposite sides thereof.

9. A die assembly for swaging the entering portion of a cylindrical screw blank as set forth in claim 6 wherein holder means encircles said first, second and third die sections.

10. A die device for swaging the entering portion of a cylindrical screw blank as set forth in claim 6 wherein the peripheries of said die sections define a cylinder, and annular holding means adjacently encircles said die sections.

11. A die assembly for swaging the entering portion of a cylindrical screw blank as set forth in claim 3 wherein the pilot-forming bore means is included in the second die section.

12. A die assembly for swaging the entering portion of a cylindrical screw blank as set forth in claim 3, wherein the larger extremity of said substantially conical bore at the juncture thereof with said cylindrical bore, in transverse section defines a plane intersecting the axis of said cylindrical bore at an acute angle.

13. A die assembly for swaging the entering portion of a cylindrical screw blank as set forth in claim 3, wherein the smaller extremity of said substantially conical bore at the juncture thereof with said pilot-forming bore, in transverse section defines a plane intersecting the axis of said pilot-forming bore at an acute angle.

14. A die assembly for swaging the entering portion of a cylindrical screw blank as set forth in claim 3, wherein the larger and smaller extremities of said substantially conical bore at the respective junctures thereof with said cylindrical and pilot-forming bores define planes intersecting the axis of said cylindrical and pilot-forming bores at an acute angle.

15. A die assembly for swaging the entering portion of a cylindrical screw blank as set forth in claim 3, wherein the larger extremity of said substantially conical bore has a minor diameter approximating the diameter of the cylindrical bore and a major diameter slightly larger than the diameter of said cylindrical bore, to enable the associated screw blank to enter the substantially conical bore without substantial abrupt resistance thereto.

* * * * *

UNITED STATES PATENT OFFICE
CERTIFICATE OF CORRECTION

Patent No. 3,835,495          Dated SEPTEMBER 17, 1974

Inventor(s) HENRY ANTON SYGNATOR

It is certified that error appears in the above-identified patent and that said Letters Patent are hereby corrected as shown below:

Col. 1, line 40, "and" should be --said--
Col. 2, line 48, after "third" insert --die--
Col. 3, line 46, after "generally" the word --elliptical-- was omitted
Col. 3, line 59, after "third" insert --die--
Col. 3, line 66, "ane" should be --and--
Col. 4, line 1, "axis" should be --axes--
Col. 4, line 26, after "assembly" insert --is--
Col. 4, line 27, "aspects" should be --respects--
Col. 4, line 47, "substantically" should be --substantially--
Col. 4, line 59, "cylindrial" should be --cylindrical--
Col. 5, line 63-4 after "axial" insert --extent--
Col. 6, line 17, after "including" insert --opposing--

Signed and sealed this 31st day of December 1974.

(SEAL)
Attest:

McCOY M. GIBSON JR.          C. MARSHALL DANN
Attesting Officer             Commissioner of Patents